2 Sheets—Sheet 1.

J. BRAMBLE & H. M. DEIHL.

Assignors to J. F. PARET.

Piano-Stool.

No. 8,294. Reissued June 25, 1878.

WITNESSES

Wm. A. Skinkle.

Roderdean Buchanan.

INVENTORS

James Bramble

Hugh M Deihl.

By their Attorneys

Baldwin Hopkins & Peyton

J. BRAMBLE & H. M. DEIHL.

Assignors to J. F. FARET.

Piano-Stool.

No. 8,294. Reissued June 25, 1878.

WITNESSES

Wm A Skinkle

Roberdeau Buchanan.

By their Attorneys

Baldwin, Hopkins & Peyton

INVENTORS

James Bramble

Hugh M Deihl

UNITED STATES PATENT OFFICE.

JAMES BRAMBLE, OF MANAYUNK, PENNSYLVANIA, AND HUGH M. DEIHL, OF FORT WAYNE, INDIANA, ASSIGNORS TO JOHN F. PARET, OF WASHINGTON, D. C.; SAID PARET ASSIGNOR TO SAMUEL S. WHITE, OF PHILADELPHIA, PA.

IMPROVEMENT IN PIANO-STOOLS.

Specification forming part of Letters Patent No. 76,044, dated March 31, 1868; Reissue No. 8,291, dated June 25, 1878; application filed May 24, 1878.

*To all whom it may concern:*

Be it known that we, JAMES BRAMBLE, formerly of Fort Wayne, in the county of Allen and State of Indiana, but now residing at Manayunk, in the county of Philadelphia and State of Pennsylvania, and HUGH M. DEIHL, of Fort Wayne aforesaid, have jointly invented a new and Improved Piano-Stool; and we do hereby declare that the following is a full, clear, and exact description thereof, which will enable those skilled in the art to make and use the same, reference being had to the accompanying drawings, forming part of this specification.

Our invention relates to a seat supporting and adjusting mechanism, whereby the seat is automatically retained or supported in any position, to which it may be adjusted or elevated in reference to a base or stand.

The object of our invention is to render the adjustment of the seat easy to the operator, noiseless, and free from shocks, jars, or unpleasant feelings to the occupant, and to obviate the many objections heretofore experienced with the most approved kinds of seat-elevating mechanism and devices.

The first part of our invention consists in the application to a seat-support of the principle of hydrostatics, or, in other words, of a fluid supporting-column.

The next part of our invention consists in the employment, in connection with a seat-support, of an elevating foot-lever, whereby the operator is enabled to raise the seat to any desired height by the use of the foot alone, leaving the hands free and disengaged, and without the necessity of stooping when the seat is to be adjusted.

The subject-matter claimed is hereinafter specifically stated.

The accompanying drawings represent a piano-stool constructed and operating according to our invention.

Figure 1:
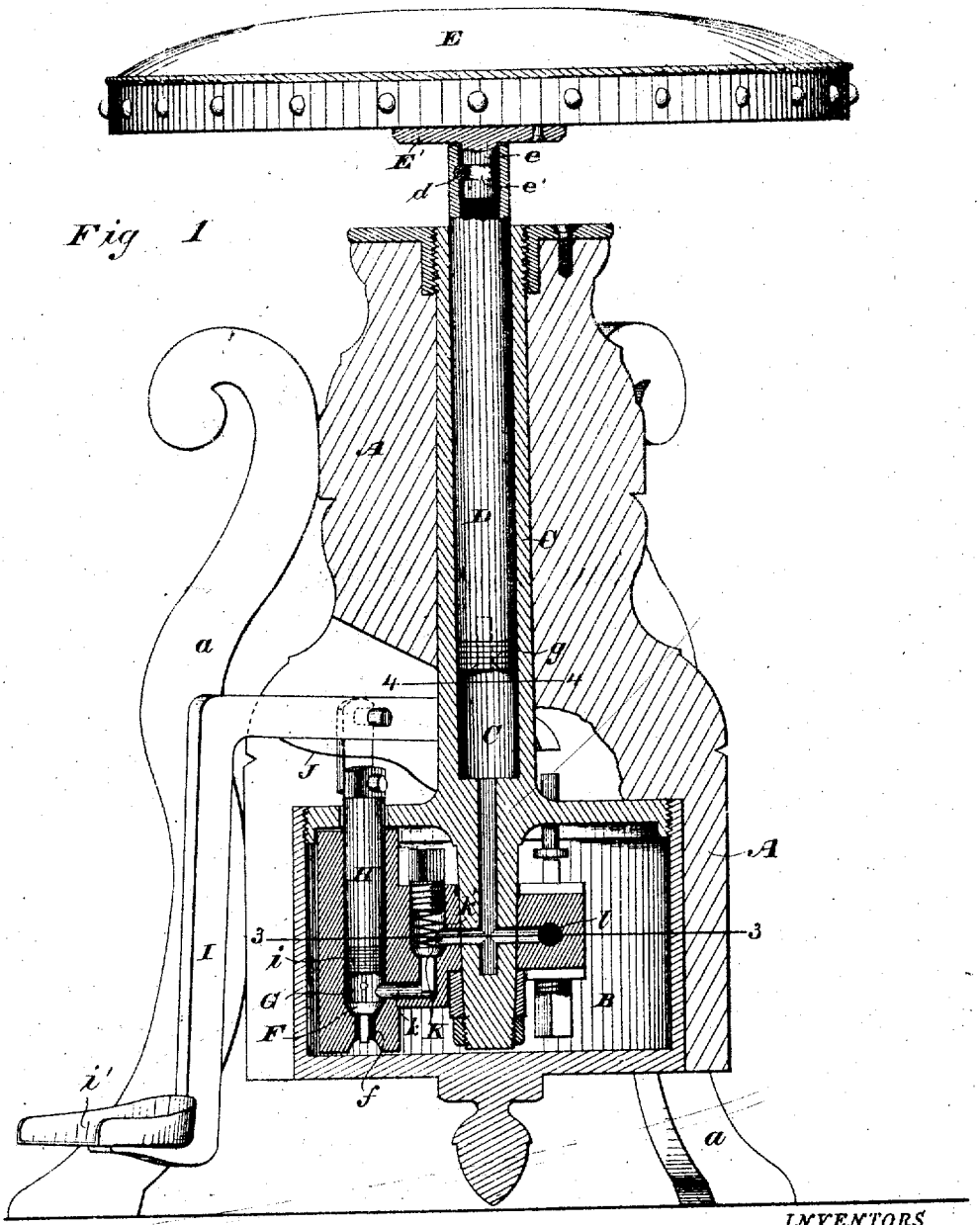
Figure 2:
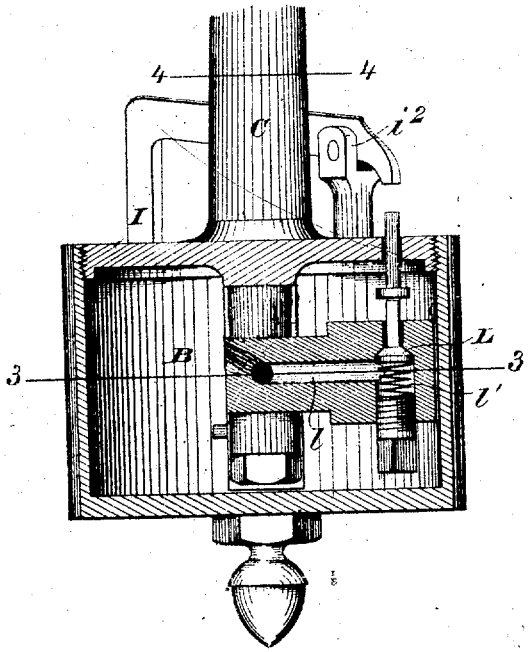
Figure 5:
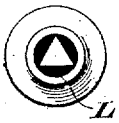
Figure 3:
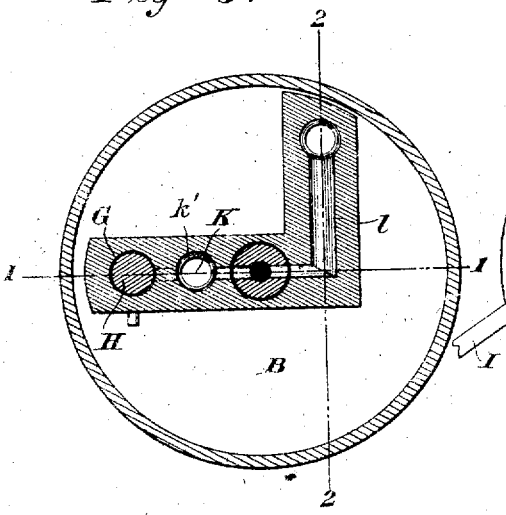
Figure 4:
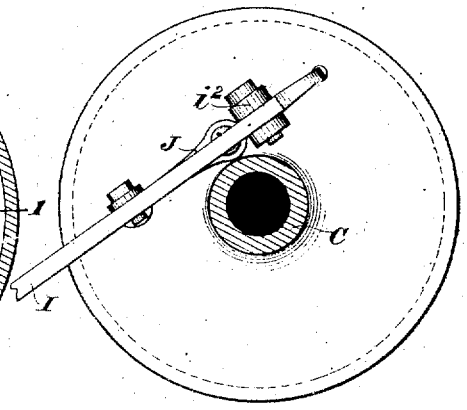

Figure 1 represents a vertical central section therethrough (below the seat) on the line 1 1 of Fig. 3; Fig. 2, a vertical section on the line 2 2 of Fig. 3 through the fluid-reservoir and a portion of the adjusting apparatus, showing more particularly the outlet or escape valve, by which the fluid passes from the cylinder to the reservoir as the seat is lowered; Fig. 3, a horizontal transverse section through the apparatus on the line 3 3 of Figs. 1 and 2; Fig. 4, a transverse section through the cylinder (in which the elevating plunger or seat-support works) on the line 4 4 of Figs. 1 and 2, showing a plan view of the fluid-reservoir and elevating foot-lever; and Fig. 5, a plan or top view of the outlet or escape valve.

The stand or base A is mounted on legs *a*, and incloses a water-chamber or liquid-reservoir, B. An accurately-bored water-tight metallic cylinder or tube, C, is connected with the reservoir, and supported in the base. A plunger, spindle, or seat-support, D, fitted and capable of turning and moving freely endwise in the cylinder or tube C, carries a seat, E, upon its upper end; and, in order still further to facilitate this horizontal revolving or turning movement, we mount the seat upon its support in such manner that it may be turned independently thereof. This is done by securing to the seat a plate, E′, having a round portion or journal, *e*, which is inserted or fitted in the upper end of the tubular plunger, piston, or support D. This journal *e* is provided with a circumferential groove, *e′*, with which engages a pin, *d*, inserted tangentially in the bore of the plunger, by which means the seat is securely locked from endwise movement independently of the plunger, while free to turn horizontally thereon.

The plunger or support D carries suitable packing *g*, which insures a tight joint between it and the cylinder or tube C, in which it moves.

An inlet-valve, F, works in a duct, pipe, or channel, *f*, leading from the reservoir B to a pump-cylinder, G, in which latter a plunger, H, provided with a suitable packing, *i*, works.

To adapt the plunger H to be worked by the foot of the operator, (to avoid the necessity of stooping,) it is linked or jointed to a foot-lever, I, shown as pivoted upon a bracket or lugs, $i^2$, formed upon the casing of the fluid-reservoir, and provided at its outer or lower end with a foot piece or rest, $i^1$.

This foot-lever is provided with a retracting-spring, J, which, when the treadle end of the foot-lever I is depressed and after the pressure is removed, tends to elevate said foot-lever, and consequently automatically to lift or bring the plunger into position for another operation or depression by the foot of the operator during the elevation of the seat, thus obtaining a step-by-step movement.

The fluid that enters the pump chamber or cylinder passes therefrom through a pipe or channel, $k$, provided with a valve, K, to the cylinder or tube C underneath the piston or support D. The valve K is acted upon by a coiled spring, $k^1$, for an obvious purpose.

By this mode of construction, when the ascent of the seat ceases the valve K will be immediately closed by its spring, and the weight of the seat and of the occupant will rest upon the fluid in the cylinder, the automatic closing of the valves being facilitated and insured by the back pressure upon them, whereby the seat will remain in its elevated position, without strain on the elevated mechanism, by means of the cushioning and sustaining fluid-column.

To lower the seat, we provide a pipe, channel, or passage, $l$, for the escape or discharge of the fluid, leading from the cylinder C to the fluid-reservoir B, the opening or channel being closed by an outlet or escape valve, L, whereby, when the valve is opened, the fluid in the cylinder will be displaced and the supporting-piston will gradually descend to its lowest position, carrying the seat and occupant with it, the rate of descent being regulated by the extent of the opening of the valve.

The escape-valve is pressed to its seat by a spiral spring, $l'$, and by the pressure of the fluid in the cylinder, and can only leave its seat when its projecting shank or stem is acted upon for the purpose, which is accomplished by means of the hooked or curved extended end of the elevating foot-lever, which end is brought in contact with the projecting stem of the valve by a back action or elevation of the treadle end of the lever to a greater extent than that which it normally assumes when raised by its spring.

It will be observed that the valve opens inwardly against the pressure of the fluid and of its spring to permit of the escape of the fluid, the advantage of which is that the valve is closed automatically the moment it is released by the operator.

The operation will be readily understood from the foregoing description.

For raising the seat of the stool, the operator presses with his foot upon the foot-piece or treadle end of the elevating-lever, which presses down the plunger of the force-pump and forces water, or whatever liquid may be contained in the reservoir, into the cylinder or tube D beneath the plunger or seat-support. Water being non-elastic, the least movement of the plunger forces up the valve K, and the fluid flows into the cylinder, raising the seat by the pressure on the end of its support or plunger, which operation may be accomplished by the most steady and gentle motion.

To lower the seat, the treadle end of the lever may be raised by the foot of the operator, and if the operator be seated upon the stool, the heel may be utilized for this movement, which brings the opposite end of the lever in contact with the stem of the valve, forcing it open, as hereinbefore stated, thereby allowing the sustaining fluid-column or liquid to be displaced by escaping into the reservoir, and the seat to be lowered gradually, easily, and without shock or jar.

From the foregoing description of the embodiment of our invention it will be obvious that we are enabled to retain a seat in its elevated position by means of its supporting piston or plunger and the fluid-column, the mechanism being all compactly arranged upon, supported by, or inclosed within the base or stand, and are also enabled to elevate the seat by the hydraulic pressure of the liquid itself, and to lower it by opening a discharge-valve, both the raising and lowering being noiseless; and in the organization and arrangement of the seat and elevating-lever shown in the drawing the person occupying the seat may be the operator.

We believe ourselves to be the first ever to have combined with a seat and its supporting-base a means of adjustment for the seat possessing the advantages and capabilities of our invention, and one which renders the adjustment of a seat and its occupant easy and convenient to the operator, and without shocks, jars, or unpleasant feelings to the occupant.

We do not confine ourselves to the particular arrangement shown and described for controlling the height of a seat by the pressure of water or other fluid. The details may, perhaps, be somewhat varied and the same result be produced.

Having thus described our invention, we claim as new and desire to secure by Letters Patent—

1. The combination, substantially as hereinbefore set forth, of the base or stand, the vertically-movable plunger or spindle mounted therein, the seat mounted on the plunger, and the fluid-column to hold said seat at any point to which it may be raised, and to permit it, when desired, to pass gradually and without shock from that elevated point to a lower one.

2. The combination, substantially as hereinbefore set forth, of the base or stand, the vertically-movable plunger or spindle, the seat mounted on the plunger or spindle, mechanism for raising the seat, and the fluid-column to hold said seat at any point to which it may be raised by the lifting mechanism, and to permit it, when desired, to pass gradually and without shock from that elevated point to a lower one.

3. The combination, substantially as hereinbefore set forth, of the base or stand, the fluid-reservoir and cylinder mounted therein, the plunger or spindle, movable vertically endwise in the cylinder, the seat mounted on the plunger, the pipe or channel connecting the cylinder and reservoir, and the inlet-valve in the channel, for the purposes specified.

4. The combination, substantially as hereinbefore set forth, of the base or stand, the fluid-reservoir mounted thereon and enveloped thereby, the cylinder carried by the base, and the plunger carrying a seat and working within the cylinder.

5. The combination, substantially as hereinbefore set forth, of the seat mounted on the plunger, the cylinder in which the plunger moves endwise, the fluid-reservoir mounted in the base or stand, the inlet-valve, which permits the fluid to follow the ascent of the supporting-plunger, and another or outlet valve, which permits the fluid slowly to be displaced by the descending plunger, to insure the gradual and easy descent of the seat.

6. The combination, substantially as hereinbefore set forth, of the base, the cylinder mounted thereon, the plunger carrying a seat and movable endwise in the cylinder, the fluid-reservoir, also mounted on the base, and valves connecting the reservoir with the cylinder, whereby, as the chair is raised or lowered, the fluid is transferred from the reservoir to the cylinder, and vice versa.

7. The combination, substantially as hereinbefore set forth, of the base or stand, the fluid-cylinder mounted thereon, the plunger movable endwise in the cylinder, and the seat carried by said plunger and capable of a horizontal turning movement relatively to the base.

8. The combination, substantially as hereinbefore set forth, of the vertically-movable plunger, the seat, the lifting mechanism, and the elevating foot-lever, whereby the seat and occupant may be raised to any desired height by the foot of the operator.

9. The combination, substantially as hereinbefore set forth, of the vertically-movable plunger carrying the seat, the lifting mechanism, and the foot-lever acting with a step-by-step movement to raise the seat.

10. The combination, substantially as hereinbefore set forth, of the vertically-movable plunger, the seat mounted thereon, the lifting mechanism, retaining mechanism to hold said seat at any height desired, and the foot-lever.

11. The combination of the vertically-movable seat-supporting plunger, the foot-lever acting with a step-by-step movement, and the spring acting upon the lever to return it to its normal or raised position after each depression, in readiness for the next movement which is to add to the elevation of the seat, substantially as described.

JAMES BRAMBLE.
H. M. DEIHL.

Witnesses to signature of James Bramble:
JAMES F. OGIE,
WILLIAM J. CRAVEN.

Witnesses to signature of H. M. Deihl:
BAYLISS SWIFT,
U. S. OPPENHEIM.